United States Patent
Smith et al.

(10) Patent No.: US 11,639,056 B2
(45) Date of Patent: May 2, 2023

(54) FLUIDIC EJECTION CONTROLLERS WITH SELECTIVELY REMOVABLE EJECTION BOARDS

(71) Applicant: HEWLETT-PACKARD DEVELOPMENT COMPANY, L.P., Spring, TX (US)

(72) Inventors: Matthew David Smith, Corvallis, OR (US); Dennis R. Esterberg, Corvallis, OR (US); Jeffrey A. Nielsen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 310 days.

(21) Appl. No.: 16/765,795

(22) PCT Filed: Dec. 15, 2017

(86) PCT No.: PCT/US2017/066612
§ 371 (c)(1),
(2) Date: May 20, 2020

(87) PCT Pub. No.: WO2019/117937
PCT Pub. Date: Jun. 20, 2019

(65) Prior Publication Data
US 2020/0282725 A1  Sep. 10, 2020

(51) Int. Cl.
*B41J 2/14* (2006.01)
*B01L 3/02* (2006.01)
*G01N 35/10* (2006.01)
*B01L 3/00* (2006.01)

(52) U.S. Cl.
CPC .......... *B41J 2/1433* (2013.01); *B01L 3/0268* (2013.01); *B41J 2/14072* (2013.01); *B01L 3/502715* (2013.01); *B41J 2002/14491* (2013.01); *G01N 35/10* (2013.01)

(58) Field of Classification Search
None
See application file for complete search history.

(56) References Cited

U.S. PATENT DOCUMENTS 4,806,106 A * 2/1989 Mebane ................. B41J 2/1629
439/70
5,964,239 A * 10/1999 Loux ....................... B01L 9/527
251/11

(Continued)

FOREIGN PATENT DOCUMENTS

CN 103386816 B 1/2016

*Primary Examiner* — Brian R Gordon
(74) *Attorney, Agent, or Firm* — Foley & Lardner LLP

(57) ABSTRACT

In one example in accordance with the present disclosure, a fluidic ejection controller is described. The fluidic ejection controller includes a firing board to pass electrical control signals for ejecting fluid from a fluidic ejection device. An ejection board of the fluidic ejection controller is electrically coupled to, and selectively removable from, the firing board to pass the electrical control signals to the fluidic ejection device. Electrical pins are disposed on the ejection board in a pattern that matches a pattern of electrical pads on the fluidic ejection device. The electrical pins interface with corresponding electrical pads to pass the electrical control signals from the ejection board to the fluidic ejection device.

13 Claims, 10 Drawing Sheets

(56) References Cited

U.S. PATENT DOCUMENTS

| | | | |
|---|---|---|---|
| 6,273,554 B1* | 8/2001 | McArdle | B41J 2/14072 |
| | | | 347/49 |
| 6,341,845 B1* | 1/2002 | Scheffelin | B41J 2/155 |
| | | | 347/50 |
| 6,431,684 B1* | 8/2002 | Olsen | B41J 2/1753 |
| | | | 347/50 |
| 6,503,454 B1 | 1/2003 | Hadimioglu | |
| 6,536,871 B1 | 3/2003 | Haddick | |
| 6,652,057 B2 | 11/2003 | Masuda | |
| 8,251,471 B2 | 8/2012 | Fontaine | |
| 8,911,044 B2 | 12/2014 | Takamura | |
| 9,274,140 B2 | 3/2016 | Rose | |
| 9,333,060 B2 | 5/2016 | Hunter | |
| 9,415,591 B2 | 8/2016 | Lee | |
| 9,433,939 B2 | 9/2016 | Dudenhoefer | |
| 2003/0007034 A1* | 1/2003 | Horvath | B41J 2/155 |
| | | | 347/50 |
| 2008/0115599 A1* | 5/2008 | Masters | B01L 3/502715 |
| | | | 73/866 |
| 2010/0053273 A1 | 3/2010 | Silverbrook | |
| 2010/0073416 A1 | 3/2010 | Yokota | |
| 2018/0088142 A1* | 3/2018 | Yokoyama | G01N 35/1074 |
| 2020/0001302 A1* | 1/2020 | Shih | C12P 21/00 |
| 2020/0298230 A1* | 9/2020 | Cleland | G01N 15/12 |
| 2020/0324289 A1* | 10/2020 | Chen | B01L 3/5025 |
| 2022/0297122 A1* | 9/2022 | Spink | G01N 15/1459 |
| 2022/0322538 A1* | 10/2022 | Kannan | B01L 3/0268 |
| 2022/0395837 A1* | 12/2022 | Newman-Lehman | |
| | | | B01J 19/0046 |

* cited by examiner

FLUIDIC EJECTION CONTROLLERS WITH SELECTIVELY REMOVABLE EJECTION BOARDS

BACKGROUND

An assay is a process used in laboratory medicine, pharmacology, analytical chemistry, environmental biology, and molecular biology to assess or measure the presence, amount, or functional activity of a sample. The sample may be a drug, a genomic sample, a proteomic sample, a biochemical substance, a cell in an organism, an organic sample, or other inorganic and organic chemical samples. In general, an assay is carried out by dispensing small amounts of fluid into multiple wells of a titration plate. The fluid in these wells can then be processed and analyzed. Such assays can be used to enable drug discovery as well as facilitate genomic and proteomic research.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
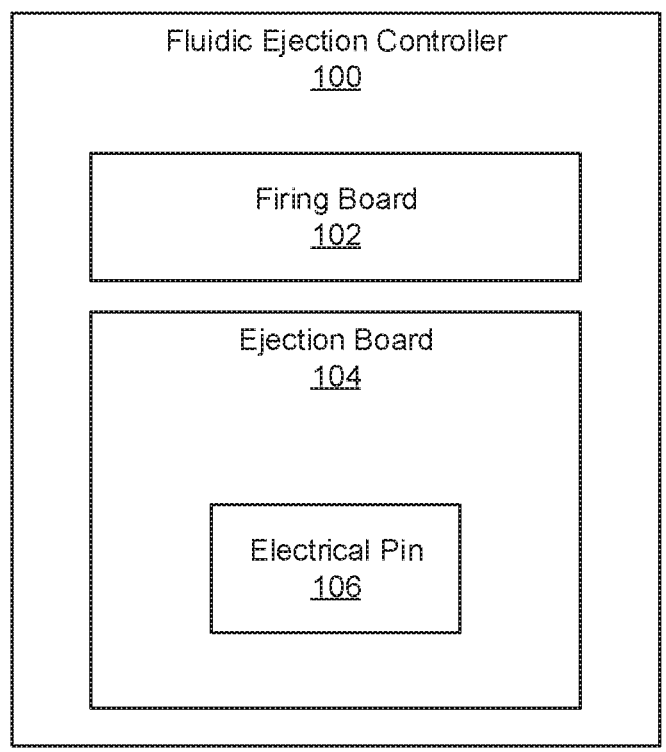
FIG. 1 is a block diagram of a fluidic ejection controller with a removable ejection board, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An assay is a process used in laboratory medicine, pharmacology, analytical chemistry, environmental biology, and molecular biology to assess or measure the presence, amount, or functional activity of a sample. The sample may be a drug, a genomic sample, a proteomic sample, a biochemical substance, a cell in an organism, an organic sample, or other inorganic and organic chemical samples. In general, an assay is carried out by dispensing small amounts of fluid into multiple wells of a titration plate. The fluid in these wells can then be processed and analyzed. Such assays can be used to enable drug discovery as well as facilitate genomic and proteomic research.

Such assays have been performed manually. That is, a user fills fluid into a single channel pipette, or a multi-channel pipette, and manually disperses a prescribed amount of fluid from the pipette into various wells of a titration plate. As this process is done by hand, it is tedious, complex, and inefficient. Moreover, it is prone to error as a user may misalign the pipette with the wells of the titration plate and/or may dispense an incorrect amount of fluid.

Some automated fluidic ejection systems have been developed to eject predetermined amounts of fluid into the wells of a titration plate. In these examples, a controller activates an ejecting component that ejects an amount of fluid into the various wells of a titration plate. The system also handles the titration plate to ensure proper alignment of the ejecting component and the wells of the titration plate. However, the complexity and cost of these systems may prevent their more complete implementation. Moreover, the electrical connection between an ejecting head that ejects the fluid and a fluidic ejection system can be exposed, or involve complex motors to establish the electrical connections. Still further, the electrical circuitry of such a fluidic ejection system may not be easily updateable. That is if a new, or different fluidic ejection device is developed, the fluidic ejection system may not be able to accommodate the fluidic ejection device.

While specific reference is made to deposition of fluid into wells of a titration plate, the present systems and devices can be used to deposit fluid on other substrates or surfaces such as microscope slides, matrix assisted laser desorption/ionization (MALDI) plates, and microfluidic chips among other substrates or surfaces.

Accordingly, the present specification describes a fluidic ejection controller that is easily customizable to a specific fluidic ejection device. Specifically, the present specification describes a fluidic ejection controller that includes a firing board to generate firing signals, and to otherwise control the dispensing of fluid from the fluidic ejection device. An ejection board is electrically coupled to the firing board. The ejection board makes an electrical connection with the firing board and with an inserted fluidic ejection device. The ejection board may be unique to the fluidic ejection device. That is, to pass electrical control signals to the fluidic ejection device, the ejection board has electrical pins that interface with electrical pads on the fluidic ejection device. The pin pattern on the ejection board may correspond to, and be unique to, the fluidic ejection device. Moreover, the ejection board is removable from the fluidic ejection controller such that if a fluidic ejection controller is damaged, or a new fluidic ejection device is used, the ejection board, and not the entire firing board and/or system, could be replaced.

Specifically, the present specification describes a fluidic ejection controller. The fluidic ejection controller includes a firing board to pass electrical control signals for ejecting fluid from a fluidic ejection device. An ejection board of the controller is electrically coupled to, and selectively removable from, the firing board to pass the electrical control signals to the fluidic ejection device. Electrical pins are disposed on the ejection board in a pattern that matches a pattern of electrical pads on the fluidic ejection device. The electrical pins interface with corresponding electrical pads to pass the electrical control signals from the ejection board to the fluidic ejection device.

The present specification also describes a fluidic ejection system. The system includes a fluidic ejection device that includes a reservoir disposed on a first side of a substrate and a fluid ejection die disposed on an opposite side of the substrate. Each fluid ejection die includes an array of nozzles, where each nozzle includes an ejection chamber, an opening, and a fluid actuator disposed within the ejection chamber. The fluidic ejection device also includes an electrical pad to receive electrical control signals. The fluidic ejection system also includes a fluidic ejection controller that includes the firing board, the ejection board, and electrical pins disposed on the ejection board. In this example, the electrical pins are disposed in a pattern that matches a pattern of the electrical pads on the fluidic ejection device.

The present specification also describes a fluidic ejection controller. In this example, the fluidic ejection controller includes the firing board, ejection board, and electrical pins disposed on the ejection board in a pattern that matches a pattern of electrical pads on the fluidic ejection device. In this example, the electrical pins are disposed in a pattern unique to a corresponding fluidic ejection device and the ejection board is unique to the corresponding fluidic ejection device.

In summary, using such a fluidic ejection controller with a replaceable ejection board 1) is more robust in that it protects the electrical pins; 2) is more simple to operate based on a slide-in insertion motion which alleviates an electrical pin engagement mechanism such as a motor; 3) enables user-replacement of the electrical pin assembly on an ejection board without replacement of an entire firing board; 4) enables upgrade of the ejection board to an ejection board with a different number, or different arrangement, of electrical pins. The different electrical pins, when paired with corresponding electrical pads, can enable new functionality.

As used in the present specification and in the appended claims, the term "a number of" or similar language is meant to be understood broadly as any positive number including 1 to infinity.

Further, as used in the present specification and in the appended claims, the term "firing board" refers to a component of the fluidic ejection controller that controls a variety of fluidic ejection devices. For example, the firing board may pass signals that instruct an actuator of the ejecting head to activate and dispel an amount of fluid.

Still further, as used in the present specification and in the appended claims, the term "ejection board" refers to a component of the fluidic ejection controller that corresponds to a particular one, or multiple fluidic ejection devices. For example, the ejection board may have an electrical pin count, and orientation that corresponds with, and is unique to a pattern of electrical pads on a fluidic ejection device.

Turning now to the figures, FIG. 1 is a block diagram of a fluidic ejection controller (100) with a removable ejection board (104), according to an example of the principles described herein. As described above, the fluidic ejection controller (100) is a component of a fluidic ejection system, which fluidic ejection system operates to eject fluid. For example, the fluid could be ejected into wells of a titration plate. To eject the fluid, the fluidic ejection controller (100) receives control signals and routes them to the fluidic ejection device. In some examples, the fluidic ejection controller (100) interacts with the fluidic ejection device as the fluidic ejection device is inserted into the fluidic ejection system.

The fluidic ejection controller (100) includes a firing board (102). The firing board (102) includes the circuitry and other hardware to receive control signals and pass those control signals to the fluidic ejection device. Any number of control signals may be passed. For example, ejection signals may activate actuators on the fluidic ejection device to eject fluid therefrom. Other types of signals include sensing signals to activate a sensor to collect data regarding the fluidic ejection device or a fluid passing through the fluidic ejection device. As yet another example, a signal may activate a component of the fluidic ejection system and/or fluidic ejection device to electrically discharge fluid being ejected into the wells of the titration plate. While specific reference is made to particular control signals generated and/or passed by the firing board, any number and type of control signals may be passed to the fluidic ejection device by the fluidic ejection controller (100) through the firing board (102). In some examples, the firing board (102) is used by multiple fluidic ejection devices. That is, the firing board (102) may not be unique to a particular fluidic ejection device and is therefore universal to various type of fluidic ejection devices.

The fluidic ejection controller (100) also includes an ejection board (104) that is electrically coupled to the firing board (102). That is, via an electrical connection, control signals from the firing board (102) that originate within the fluidic ejection system, are passed through the ejection board (104). The ejection board (104) receives incoming control signals and processes them for use with a fluidic ejection device to which the ejection board (104) corresponds. That is, the fluidic ejection device may include particular functionalities and/or may have electrical pads in a particular pattern. The ejection board (104) may process control signals related to that particular functionality and may have electrical pins in the same pattern.

The ejection board (104) is also removable from the firing board (102). Accordingly, when an update to a fluidic ejection device occurs, or when a newly developed fluidic ejection device is released, rather than replacing the entire fluidic ejection controller (100) or fluidic ejection system of which it is a component, the ejection board (104) corresponding to the newly developed fluidic ejection device could be provided, and inserted into the fluidic ejection controller (100). Accordingly, the fluidic ejection controller (100) is thereby capable of update and can accommodate new, or different, fluidic ejection devices.

Electrical pins (106) are disposed on the ejection board (104). These electrical pins (106) interface with electrical pads on a fluidic ejection device installed in a fluidic ejection system. As described above, the ejection board (104) may be uniquely paired with a particular fluidic ejection device. In one example of this, the pattern of the electrical pins (106) may match with a pattern of the electrical pads on the fluidic ejection device. An example of such matched pairing is described below in connection with FIGS. 8 and 9. Such a removable ejection board (104) with its electrical pins (106) disposed thereon enables user replacement of the electrical pins (106) without replacement of larger and more expensive components such as the firing board (102). For example, a user may change to an ejection board (104) with a different number, and/or different arrangement, of electrical pins (106). The different quantity of electrical pins (106) can enable new functionality not present in the original ejection board (104), such as the addition of a closed-loop feedback mechanism. This can be done without requiring a new version of the fluidic ejection system or a new firing board (102), which could be expensive, and time-consuming.

Figure 2:
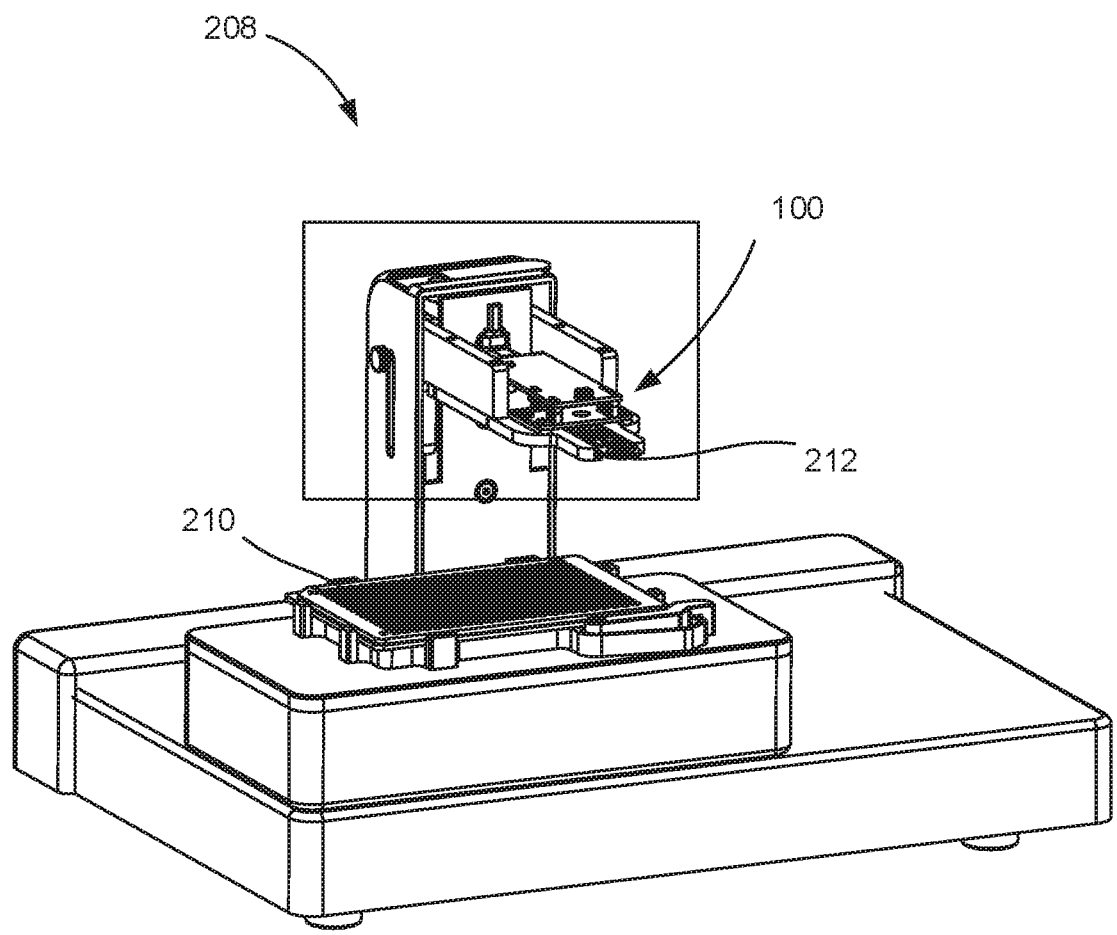
FIG. 2 is an isometric view of a fluidic ejection system with a fluidic ejection controller with a removable ejection board, according to an example of the principles described herein.

FIG. 2 is an isometric view of a fluidic ejection system (208) with a fluidic ejection controller (100) with a removable ejection board (FIG. 1, 104), according to an example of the principles described herein. In some examples, the fluidic ejection system (208) includes a fluidic ejection controller (100). The fluidic ejection device (212) is inserted into the fluidic ejection controller (100), From the fluidic ejection device (212), fluid is ejected onto a surface, such as wells of a titration plate (210). In some examples, the fluidic ejection device (212) dispenses picoliter quantities of a target fluid into microtiter plates using disposable fluidic ejection device (212). As will be described below, each fluidic ejection device (212) includes a fluidic ejection die that can rely on inkjet technology to eject fluid therefrom. Such a fluidic ejection system (208), by using inkjet components such as ejection chambers, openings, and actuators disposed within the micro-fluidic ejection chambers, enable low-volume dispensing of fluids such as those used in life science and clinical applications. Examples of such applications include dose-response titrations, polymerase chain reaction (PCR) miniaturization, microarray printing, drug-drug combination testing, drug repurposing, drug metabolism and pharmacokinetics (DMPK) dispensing and a wide variety of other life science dispensing.

The titration plate (210) may be any plate that receives a fluid ejected from the fluidic ejection device (212). The titration plate (210) includes wells into which the fluid may be ejected.

Figure 3:
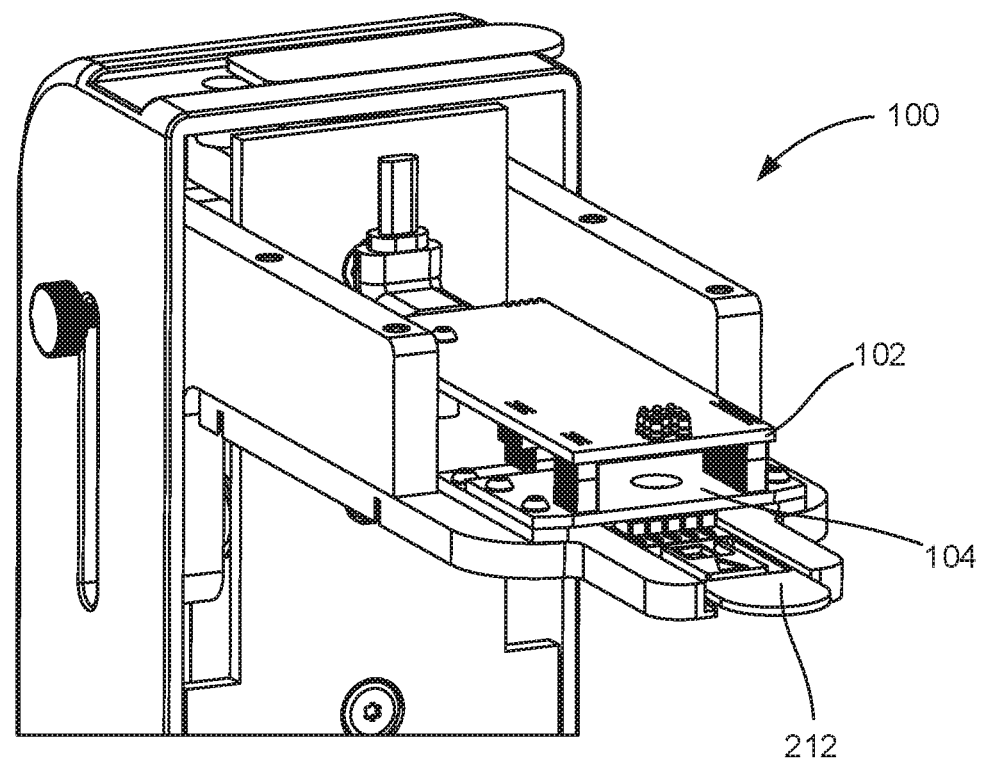
FIG. 3 is a zoomed in view of a fluidic ejection controller with a removable ejection board in a fluidic ejection system, according to an example of the principles described herein.

FIG. 3 is a zoomed-in view of a fluidic ejection controller (100) with a removable ejection board (104) installed in a fluidic ejection system (FIG. 2, 208), according to an example of the principles described herein. Specifically, FIG. 3 depicts the fluidic ejection controller (100) in an assembled state. As can be seen in FIG. 3, in some examples, the ejection board (104) is disposed between the firing board (102) and the fluidic ejection device (212).

As described above, the ejection board (104) is modular to the firing board (102) and the fluidic ejection system (FIG. 2, 208) as a whole. For example, screws or other connectors may mechanically fasten the ejection board (104) to the fluidic ejection system (FIG. 2, 208). Electrical connectors on the ejection board (104) make contact with, or otherwise mate with, corresponding electrical connectors on the firing board (102) such that electrical signals from the firing board (102) may be passed to the ejection board (104) where they may be tailored or otherwise manipulated to control the fluidic ejection device (212) that corresponds to the firing board (104).

Such a modular design allows for increased use of the fluidic ejection system (FIG. 2, 208) as the system is customizable to different fluidic ejection devices (212). That is, newly developed fluidic ejection devices (212) that may have different functionality or pad patterns, can be used by simply swapping out an old ejection board (104) for a different one to be used with the newly developed fluidic ejection device (212). Moreover, if electrical pins (106) become damaged, rather than replacing an entire firing circuitry, just the ejection board (104) may be replaced, thus reducing the cost of repair.

While FIG. 3 depicts a single fluidic ejection device (212) being received into the fluidic ejection controller (100), multiple fluidic ejection devices (212) may be inserted therein. For example, multiple fluidic ejection dies may be formed in a substrate and inserted into the fluidic ejection controller (100).

Figure 4:
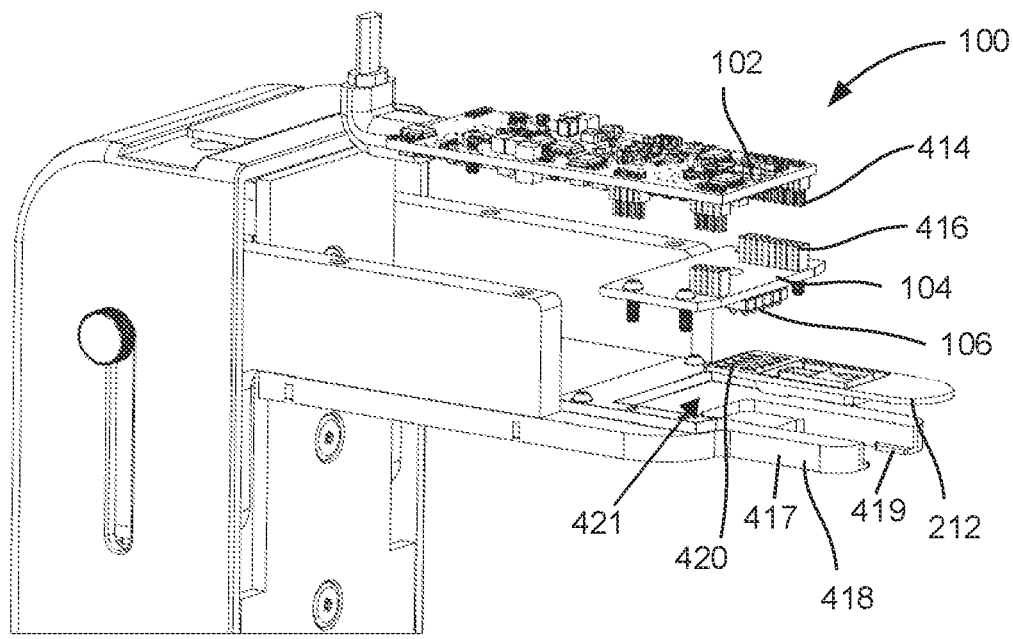
FIG. 4 is an exploded view of a fluidic ejection controller with a removable ejection board in a fluidic ejection system, according to an example of the principles described herein.

FIG. 4 is an exploded view of a fluidic ejection controller (100) with a removable ejection board (104) installed in a fluidic ejection system (FIG. 2, 208), according to an example of the principles described herein. FIG. 4 clearly depicts the electrical connectors (414) on the firing board (102) and the corresponding electrical connectors (416) on the ejection board (104) that are coupled together to route signals from the firing board (102) to the ejection board (104) where they are conditioned for the fluidic ejection device (212) that is inserted, and that is uniquely paired to interface with the ejection board (104).

FIG. 4 also clearly depicts the electrical pins (106) and the electrical pads (420) that interface with one another when the fluidic ejection device (212) is installed into the fluidic ejection controller (100). Via this electrical connection, the fluidic ejection die of the fluidic ejection device (212) is activated to eject a corresponding fluid. That is, through this connection, the fluidic ejection die of the fluidic ejection device (212) receives electrical signals directing when, where, and how to eject an amount of fluid therefrom. In an example, the fluidic ejection device (212) may be moved relative to a titration plate (FIG. 2, 210) and/or the titration plate (FIG. 2, 210) may be moved relative to the fluidic ejection device (212) such that placement of the fluidic ejection die over any portion of the titration plate (FIG. 2, 210) and ejection of fluid from the fluidic ejection die allows an amount of fluid to be ejected into any number of wells in the titration plate (FIG. 2, 210). The ejection of the fluid from the fluidic ejection die is directed by a controller of the system as described above.

In some examples, the fluidic ejection controller (100) includes a guide mechanism (418) to align the fluidic ejection device (212) with the ejection board (104). For example, the guide mechanism (418) may have walls (417, 419), and a portion of a floor (421) that support, and guide, the fluidic ejection device (212) as it is slid into place.

Figure 5:
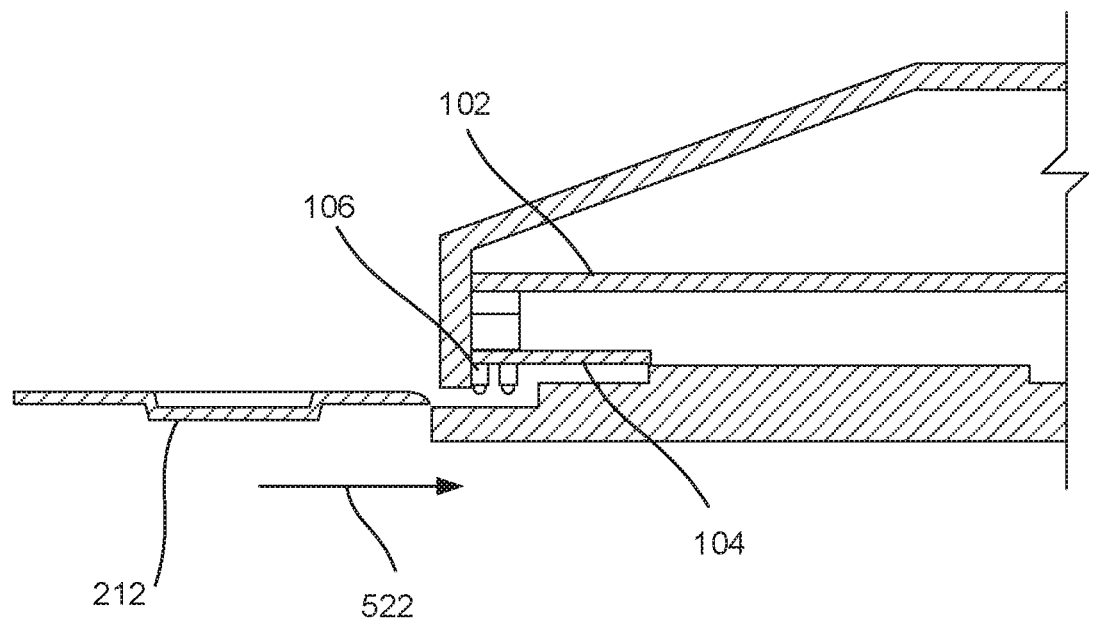
FIG. 5 is a cross-sectional view of a fluid ejection device prior to installation into a fluidic ejection controller with a removable ejection board, according to an example of the principles described herein.

FIG. 5 is a cross-sectional view of a fluid ejection device (212) prior to insertion into a fluidic ejection controller (FIG. 1, 100) with a removable ejection board (104), according to an example of the principles described herein. In some examples, a fluidic ejection device (212) is positioned for fluidic ejection by sliding the fluidic ejection device (212) into electrical contact with the fluidic ejection controller (FIG. 1, 100). For example, a user may grasp the fluidic ejection device (212), and slide it in a direction indicated by the arrow (522). Note that in FIG. 5, the electrical pins (106) are not yet contacting the electrical pads (FIG. 4, 420).

Prior to installation, the electrical pins (106) are in an extended state. For example, the electrical pins (106) may be spring-loaded pins that are biased towards an extended position. However, when in contact with the leading edge of the fluidic ejection device (212), the electrical pins (106) retract into a housing. In some examples, the leading edge of the fluidic ejection device (212) includes a bezel to deflect the electrical pins (106) into the housing upon insertion of the fluidic ejection device (212) into the fluidic ejection controller (FIG. 1, 100). Without such a bezel, damage to the electrical pins (106) may occur as they come into contact with a vertical leading edge of the fluidic ejection device (212).

Figure 6:
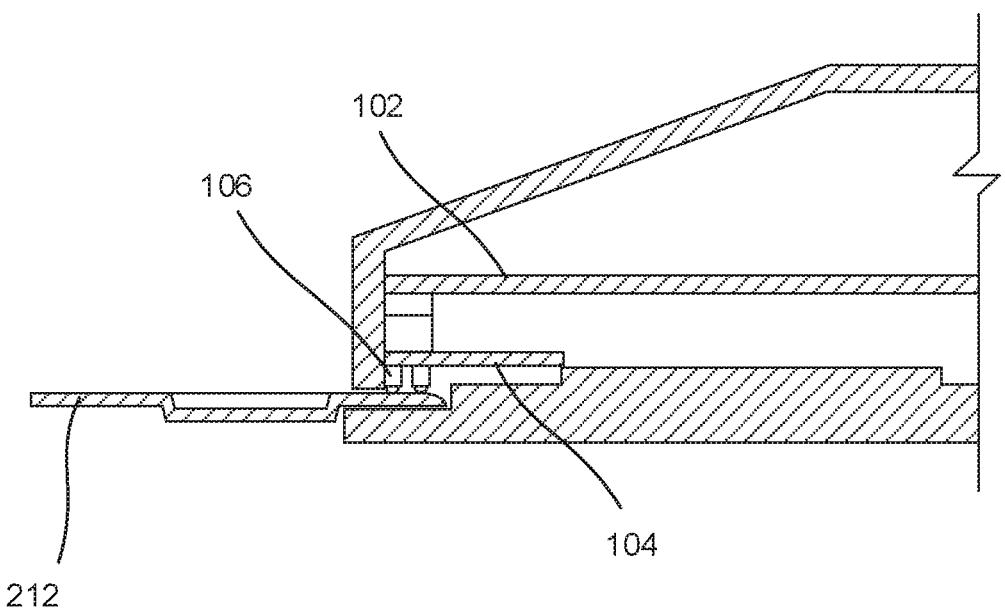
FIG. 6 is a cross-sectional view of a fluid ejection device following installation into a fluidic ejection controller with a removable ejection board, according to an example of the principles described herein.

FIG. 6 is a cross-sectional view of a fluid ejection device (212) inserted into a fluidic ejection controller (FIG. 1, 100) with a removable ejection board (104), according to an example of the principles described herein. As depicted in FIG. 6, the fluidic ejection device (212) is fully seated within the fluidic ejection controller (100). That is, the electrical pins (106), now in a retracted state, are aligned with the electrical pads (FIG. 4, 420) of the fluidic ejection device (212). By providing manually aligned electrical pins (106) and electrical pads (FIG. 4, 420), the complexity of the fluidic ejection setup is reduced, as is the operation of the fluidic ejection system (FIG. 2, 208) as a whole. For example, rather than relying on motorized engagement features to align the electrical pins (106) with the electrical pads (FIG. 4, 420), alignment occurs as a user slides the fluidic ejection device (212) into place. Put another way, the fluidic ejection controller (FIG. 1, 100) as described herein provides for a sliding-in motion of the fluidic ejection device (212) into the fluidic ejection controller (FIG. 1, 100) to establish an electrical connection. This can eliminate the use a powered electrical engagement mechanism, which is prone to breaking down, is more complex to operate, and is more costly to manufacture.

Figure 7:
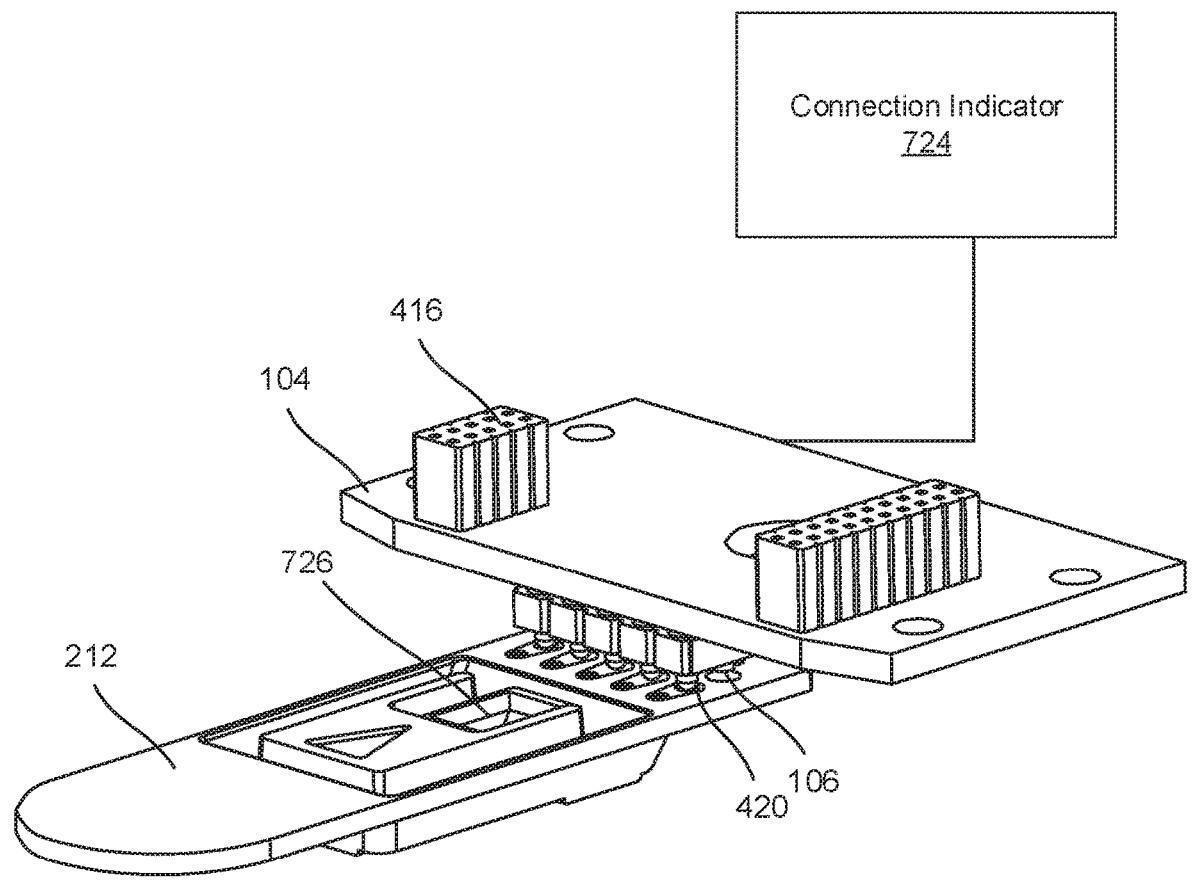
FIG. 7 is an isometric view of a fluidic ejection device following installation into a fluidic ejection controller with a removable ejection board, according to an example of the principles described herein.

FIG. 7 is an isometric view of a fluidic ejection device (212) aligned with a fluidic ejection controller (FIG. 1, 100) with a removable ejection board (FIG. 1, 104), according to an example of the principles described herein. FIG. 7 clearly depicts the electrical pins (106) in their retracted state, yet fully contacting the electrical pads (420). As described above, the electrical pins (106) may be biased towards an extended position such that there is downward force of the electrical pins (106) against the electrical pads (420) thus ensuring a solid electrical connection.

In some examples, the fluidic ejection controller (FIG. 1, 100) includes a connection indicator (724) which indicates a proper alignment of the fluidic ejection device (212) with the fluidic ejection controller (FIG. 1, 100). As one specific example, the connection indicator (724) may be a light-emitting diode (LED) disposed on a housing of the fluidic ejection system (FIG. 2, 208) that turns a particular color, or turns on, or flashes, when there is an electrical connection between the electrical pins (106) and the electrical pads (420).

Figure 10:
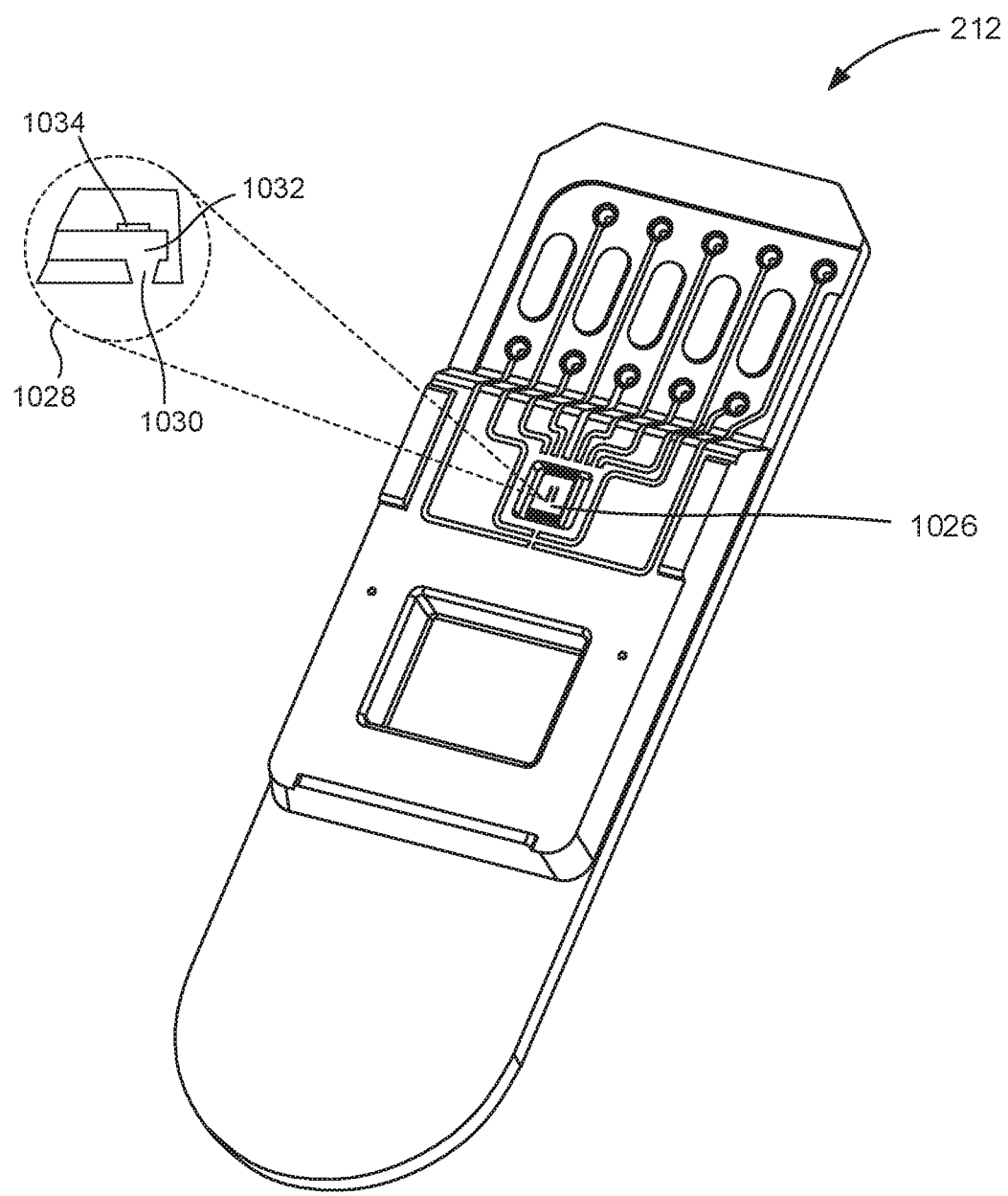
FIG. 10 is a bottom view of a fluidic ejection device, according to an example of the principles described herein.

FIG. 7 also clearly indicates the reservoir (726) which holds the fluid to be ejected. The reservoir (726) may be any void defined in the surface of the fluidic ejection device (212) that can hold an amount of fluid. The reservoir (726) provides the fluid to a die coupled to the substrate and may be on an opposite side of the fluidic ejection device (212) as the fluidic ejection die. An example of a fluidic ejection die is depicted in FIG. 10. A slot may be formed between the reservoir (726) and the fluidic ejection die to direct the fluid towards the fluidic ejection die using gravitational forces. In some examples, the reservoir (726) is exposed such that a user can deposit fluid therein.

Figure 8:
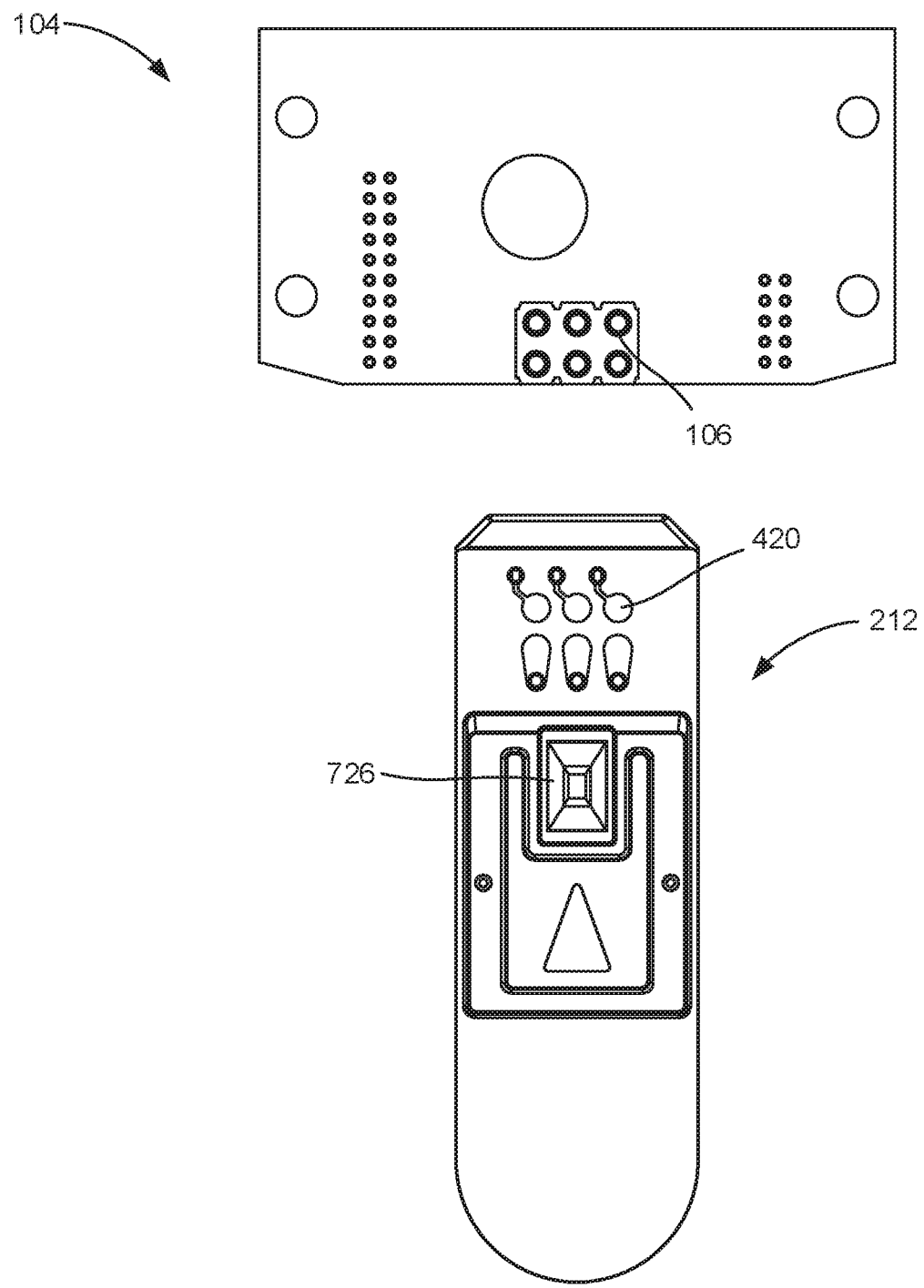
FIG. 8 is a view of an ejection board and a fluidic ejection device, according to an example of the principles described herein.

FIG. 8 is a planar view of an ejection board (104) and a fluidic ejection device (212), according to an example of the principles described herein. Specifically, FIG. 8 depicts an underside view of the ejection board (104) with its corresponding electrical pins (106) that align with the electrical pads (420) and a top view of the fluidic ejection device (212). In some examples, the electrical pins (106) are disposed away from a leading edge of the fluidic ejection controller (FIG. 1, 100).

As described above, in some examples the ejection board (104) is unique to the particular fluidic ejection device (212). More specifically, in some examples, the number and/or pattern of electrical pins (106) is unique to a particular fluidic ejection device (212). As an example, the fluidic ejection device (212) of FIG. 8 has six electrical pads (420) in a particular pattern. Accordingly, the ejection board (104) has the six electrical pins (106) arranged in the same pattern. By comparison, the fluidic ejection device (212) depicted in FIG. 9 has ten electrical pads (420) in a particular pattern. Accordingly, the corresponding ejection board (104) has ten electrical pins (106) in the same pattern.

In some examples, the fluidic ejection device (212) includes a substrate into which a reservoir (726) is formed. The substrate may be any material, such as a monolithic thermoplastic material. In some examples, the thermoplastic material is doped with a non-conductive, metallic, inorganic compound. In this example, a metal traces may be added to any surface of the substrate using a laser direct structuring (LDS) process. During the LDS process, the non-conductive, metallic, inorganic compounds are activated by a laser providing a surface into which a layer of conduct metal may be deposited using, for example, an electroless copper bath.

The substrate may be formed to allow a user to insert or otherwise interface the fluidic ejection device (212) with a fluidic ejection system (FIG. 2, 208). In the example show in FIG. 8, the substrate may include a handle. The handle allows a user to grip the fluidic ejection device (212) in order to place the fluidic ejection device (212) into the fluidic ejection system (FIG. 2, 2008). The handle allows a user to touch, pick up, and move the fluidic ejection device (212) without contaminating the reservoir (726) or a fluid deposited therein.

Figure 9:
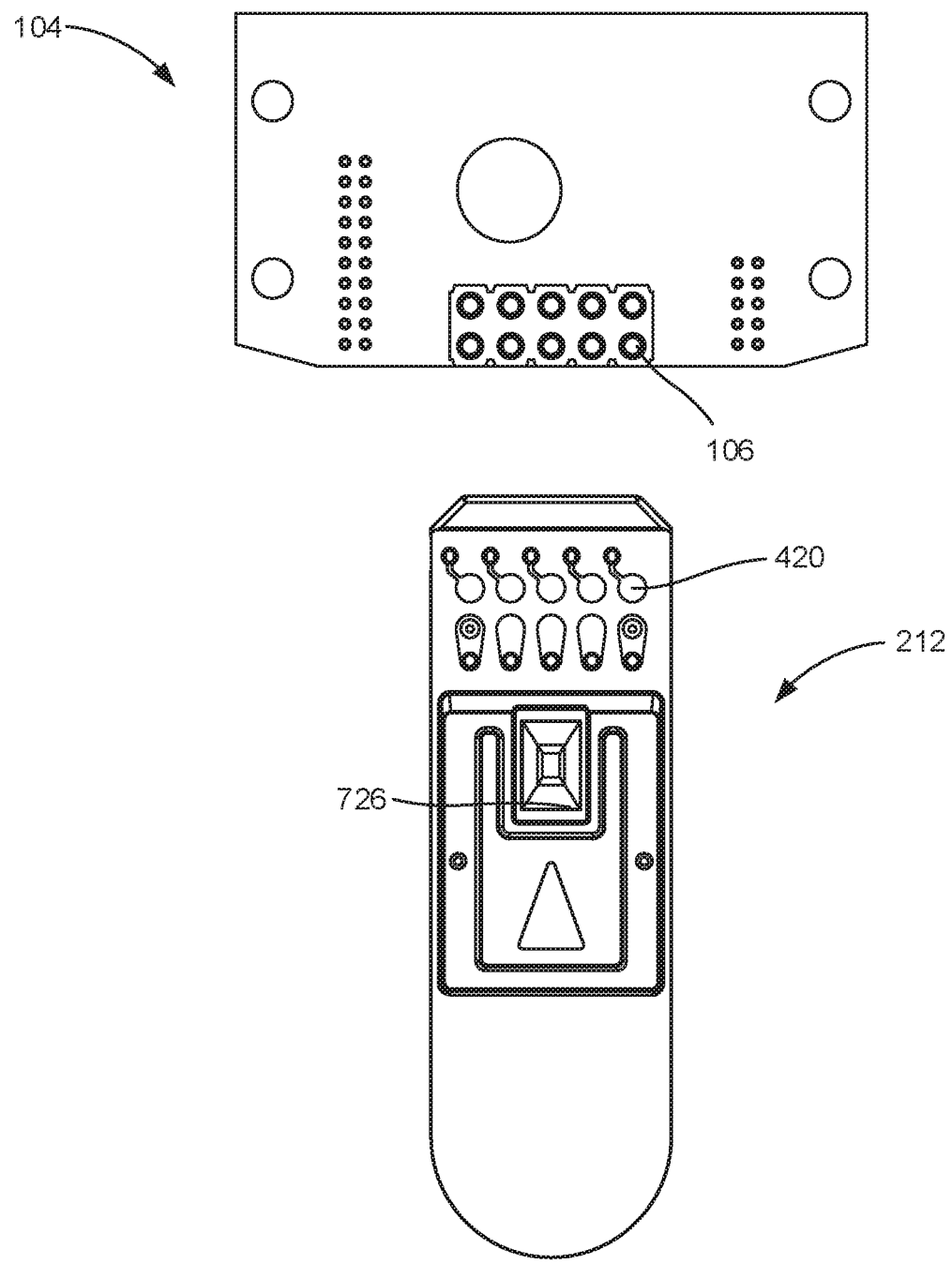
FIG. 9 is a view of another ejection board and a fluidic ejection device, according to an example of the principles described herein.

FIG. 9 is a top view of another ejection board (104) and a fluidic ejection device (212), according to an example of the principles described herein. As described above, the ejection board (104) and fluidic ejection device (212) have a different number, and pattern, of electrical pins (106) and electrical pads (420). The additional pins (106) and electrical pads (420) may provide additional or different functionality. For example, the additional electrical connections can facilitate a closed-look feedback function such as sensing of die temperature and sensing a property of the fluid. This additional functionality may not have been available when a previous fluidic ejection device (212) was released. While specific reference is made to particular additional functionalities provided by the additional pins (106) and pads (420), other functionalities may exist such as providing a static bar to remove a static charge from the fluid as it is deposited.

FIG. 10 is a bottom view of a fluidic ejection device (212), according to an example of the principles described herein. As described above, the reservoir (FIG. 7, 726) is fluidly coupled to a fluidic ejection die (1026) so that the fluid may be introduced to the fluidic ejection die (1026) for ejection into a number of the wells of the titration plate (FIG. 2, 210) as instructed by a fluidic ejection system (FIG. 2, 208).

To eject the fluid, the fluidic ejection die (1026) includes an array of nozzles (1028). Each nozzle (1028) includes a number of components. For example, a nozzle (1028) includes an ejection chamber (1032) to hold an amount of fluid to be ejected, an opening (1030) through which the amount of fluid is ejected, and an actuator (1034), disposed within the ejection chamber (1032), to eject the amount of fluid through the opening (1030). It should be noted that the relative size of the nozzle openings (1030) and the fluidic ejection die (1026) are not to scale, with the nozzles (1028) being enlarged for purposes of illustration.

Turning to the actuators (1034), the actuator (1034) may include a firing resistor or other thermal device, a piezoelectric element, or other mechanism for ejecting fluid from the ejection chamber (1032). For example, the actuator (1034) may be a firing resistor. The firing resistor heats up in response to an applied voltage. As the firing resistor heats up, a portion of the fluid in the ejection chamber (1034) vaporizes to form a bubble. This bubble pushes fluid out the opening (1030) and onto the print medium. As the vaporized fluid bubble pops, fluid is drawn into the ejection chamber (1032) from a passage that connects nozzle (1028) to a fluid feed slot in the fluidic ejection die (1026), and the process repeats. In this example, the fluidic ejection die (1026) may be a thermal inkjet (TIJ) fluidic ejection die (1026).

In another example, the actuator (1034) may be a piezoelectric device. As a voltage is applied, the piezoelectric device changes shape which generates a pressure pulse in the ejection chamber (1032) that pushes the fluid out the opening (1030) and onto the print medium. In this example, the fluidic ejection die (1026) may be a piezoelectric inkjet (PIJ) fluidic ejection die (1026). In addition to these components, the fluidic ejection die (1026) may include fluidic channels and chambers through which the fluid placed in the reservoir (FIG. 7, 726) may flow through and out of the nozzles (1028).

The fluidic ejection device (212) also includes electrical components on the front and back surfaces of the substrate. The electrical components may be made of any electrically conductive material to allow for electrical signals to be sent between the fluidic ejection system (FIG. 2, 208), via the electrical pins (FIG. 1, 106) on the ejection board (FIG. 1, 104) and the fluidic ejection die (1026). For example, contact pads (FIG. 4, 420) may be included on the front surface of the substrate. The contact pads (FIG. 4, 420) provide for an electrically conducive interface between the fluidic ejection system (FIG. 2, 208) and the fluidic ejection device (212).

Vias may be formed in the fluidic ejection device (212) and are electrically coupled to the contact pads (FIG. 4, 420). The vias may be any electrical connection that goes through the substrate and couples the connection pads (FIG. 4, 420) to electrical components on the opposite side of the substrate.

The vias are coupled on the opposite side of the substrate to traces. The traces may be coupled to the fluidic ejection die (1026) using wirebonds coupled between die pads of the fluidic ejection die (1026). In this manner, a fluidic ejection system (FIG. 2, 208) via the firing board (FIG. 1, 102) and ejection board (FIG. 1, 104) may interface with the contact pads (FIG. 4, 420) defined on the front of the fluidic ejection device (212) in order to send electrical signals to the fluidic ejection die (1026) to cause the fluidic ejection die (1026) to, at least, eject an amount of fluid therefrom.

In summary, using such a fluidic ejection controller with a replaceable ejection board 1) is more robust in that it protects the electrical pins; 2) is more simple to operate based on a slide-in insertion motion which alleviates an electrical pin engagement mechanism such as a motor; 3) enables user-replacement of the electrical pin assembly on an ejection board without replacement of an entire firing board; 4) enables upgrade of the ejection board to an ejection board with a different number, or different arrangement, of electrical pins. The different quantity of electrical pins, when paired with corresponding electrical pads, can enable new functionality. However, it is contemplated that the devices disclosed herein may address other matters and deficiencies in a number of technical areas.

What is claimed is:

1. A fluidic ejection controller, comprising:
   a firing board configured to pass electrical control signals to eject for ejecting fluid from a fluidic ejection device configured to be connected to the fluidic ejection controller; and
   an ejection board comprising a housing and electrically coupled to, and selectively removable from, the firing board, which ejection board is configured to pass the electrical control signals to the fluidic ejection device, the ejection board comprising electrical pins disposed on the ejection board, wherein a number of the electrical pins is the same as a number of electrical pads arranged in a pattern on the fluidic ejection device;
   wherein the electrical pins are arranged in the same pattern on the ejection board as the pattern of the electrical pads on the fluidic ejection device; and
   wherein the electrical pins are configured to retract within the housing of the ejection board to interface with the electrical pads, the electrical pins configured to pass the electrical control signals from the ejection board to the fluidic ejection device.

2. The fluidic ejection controller of claim 1, wherein the ejection board is configured to receive multiple fluidic ejection devices simultaneously.

3. The fluidic ejection controller of claim 1, further comprising a guide mechanism configured to align the fluidic ejection device with the ejection board during installation.

4. The fluidic ejection controller of claim 3, wherein the guide mechanism comprises a first wall, a second wall, and a floor to guide the fluidic ejection device.

5. A fluidic ejection system comprising:
   a fluidic ejection device configured to eject fluid, the fluidic ejection device comprising:
      a pattern of electrical pads configured to receive electrical control signals; and
   a fluidic ejection controller comprising:
      a firing board connected to the fluid ejection device and configured to pass the electrical control signals to eject for ejecting the fluid from the fluidic ejection device; and
      an ejection board electrically coupled to, and selectively removable from, the firing board, the ejection board comprising a housing and a pattern of electrical pins,
      wherein a number of the electrical pins is same as a number of the electrical pads of the fluidic ejection device, wherein the electrical pins are arranged in the same pattern on the ejection board as the pattern of the electrical pads on the fluidic ejection device, and
      wherein the electrical pins are configured to retract within the housing to interface with the electrical pads to pass the electrical control signals from the firing board to the fluidic ejection device.

6. The fluidic ejection system of claim 5, wherein the ejection board is connected to and located between the firing board and the fluidic ejection device.

7. The fluidic ejection system of claim 5, further comprising a connection indicator on the housing which indicates an electrical connection between the electrical pads of the fluidic ejection device and the electrical pins of the fluidic ejection controller.

8. The fluidic ejection system of claim 5, wherein the fluidic ejection device further comprises:
   a substrate;
   a reservoir on a first side of the substrate to hold the fluid;

a fluidic ejection die on a second side of the substrate, the second side opposite of the first side, wherein the fluidic ejection die comprises an array of nozzles to eject the fluid; and an actuator disposed within each of the array of nozzles to eject the fluid in response to the electrical control signals.

9. The fluidic ejection system of claim 8, wherein:

the substrate comprises a bezel configured to deflect the electrical pins into the housing upon insertion of the fluidic ejection device into the fluidic ejection controller.

10. The fluidic ejection system of claim 5, wherein the electrical pins are spring-biased to allow retraction into the housing.

11. The fluidic ejection system of claim 5, wherein the fluid ejection device is configured to eject a biological fluid.

12. A fluidic ejection system controller, comprising:

a fluid ejection device comprising a pattern of electrical pads;

a fluidic ejection controller comprising:

a firing board configured to pass electrical control signals to eject fluid from the fluidic ejection device connected to the fluidic ejection controller; and an ejection board comprising a housing and electrically coupled to, and selectively removable from, the firing board, which ejection board is configured to pass the electrical control signals to the fluidic ejection device, the ejection board comprising electrical pins, wherein a number of the electrical pins is same as a number of the electrical pads on the fluidic ejection device;

wherein the electrical pins are arranged in a same pattern on the ejection board as the pattern of the electrical pads on the fluidic ejection device; and wherein the electrical pins are configured to retract within the housing of the ejection board to interface with the electrical pads to pass the electrical control signals from the ejection board to the fluidic ejection device.

13. The fluidic ejection system of claim 12, wherein the ejection board further comprises a guide mechanism configured to align the fluidic ejection device with the ejection board during installation.

\* \* \* \* \*